(12) United States Patent  
McCauley et al.

(10) Patent No.: US 9,390,018 B2  
(45) Date of Patent: Jul. 12, 2016

(54) DATA CACHE PREFETCH HINTS

(75) Inventors: Donald W. McCauley, Lakeway, TX (US); Stephen P. Thompson, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 755 days.

(21) Appl. No.: 13/588,622

(22) Filed: Aug. 17, 2012

(65) Prior Publication Data

US 2014/0052927 A1    Feb. 20, 2014

(51) Int. Cl.
  G06F 12/00    (2006.01)
  G06F 13/00    (2006.01)
  G06F 12/08    (2016.01)

(52) U.S. Cl.
  CPC ........ *G06F 12/0862* (2013.01); *G06F 12/0897* (2013.01); *G06F 2212/6028* (2013.01)

(58) Field of Classification Search
  None
  See application file for complete search history.

(56) References Cited

U.S. PATENT DOCUMENTS

| | | | |
|---|---|---|---|
| 5,664,147 A * | 9/1997 | Mayfield | 711/137 |
| 6,438,656 B1 * | 8/2002 | Arimilli et al. | 711/137 |
| 6,446,167 B1 * | 9/2002 | Mayfield et al. | 711/122 |
| 6,449,698 B1 * | 9/2002 | Deshpande et al. | 711/137 |
| 6,523,093 B1 * | 2/2003 | Bogin | G06F 12/0862 711/137 |
| 6,643,743 B1 * | 11/2003 | Hum et al. | 711/137 |
| 8,006,040 B2 | 8/2011 | Sasamoto | |
| 2003/0004683 A1 | 1/2003 | Nemawarkar et al. | |
| 2004/0117557 A1 * | 6/2004 | Paulraj et al. | 711/137 |
| 2004/0123043 A1 | 6/2004 | Rotithor | |
| 2005/0071542 A1 * | 3/2005 | Weber | G06F 12/0215 711/105 |
| 2007/0174555 A1 * | 7/2007 | Burtscher et al. | 711/137 |
| 2007/0288697 A1 | 12/2007 | Keltcher | |
| 2008/0046659 A1 | 2/2008 | Hsu | |
| 2009/0006813 A1 | 1/2009 | Singhal et al. | |
| 2009/0019229 A1 | 1/2009 | Morrow | |
| 2010/0169606 A1 * | 7/2010 | Deneau | 711/204 |
| 2011/0072218 A1 * | 3/2011 | Manne et al. | 711/136 |
| 2011/0131380 A1 | 6/2011 | Rallens et al. | |
| 2012/0054448 A1 * | 3/2012 | Thompson et al. | 711/137 |
| 2012/0066455 A1 * | 3/2012 | Punyamurtula et al. | 711/122 |
| 2012/0084511 A1 * | 4/2012 | Dooley et al. | 711/122 |
| 2012/0311270 A1 * | 12/2012 | Sun | G06F 12/0862 711/137 |
| 2013/0346703 A1 | 12/2013 | McCauley | |
| 2014/0052954 A1 * | 2/2014 | Moll | G06F 12/1036 711/205 |
| 2014/0156932 A1 * | 6/2014 | Dundas | G06F 12/0862 711/122 |
| 2014/0317356 A1 * | 10/2014 | Srinivasan | G06F 12/0862 711/137 |
| 2014/0359221 A1 * | 12/2014 | Kalamatianos | G06F 12/0811 711/122 |

OTHER PUBLICATIONS

Fei Gao et al., "Two-Level Data Prefetching", International Conference on Computer Design, Oct. 7, 2007, 7 pages.
International Search Report and Written Opinion correlating to PCT/US2013/055119, dated Dec. 9, 2013, 9 pages.
Stefan G. Berg, "Cache Prefetching", Technical Report UW-CSE Feb. 2, 2004, University of Washington, Feb. 2002, 30 pages.

* cited by examiner

*Primary Examiner* — Sean D Rossiter (57) ABSTRACT

The present invention provides a method and apparatus for using prefetch hints. One embodiment of the method includes bypassing, at a first prefetcher associated with a first cache, issuing requests to prefetch data from a number of memory addresses in a sequence of memory addresses determined by the first prefetcher. The number is indicated in a request received from a second prefetcher associated with a second cache. This embodiment of the method also includes issuing, from the first prefetcher, a request to prefetch data from a memory address subsequent to the bypassed memory addresses.

18 Claims, 7 Drawing Sheets

DATA CACHE PREFETCH HINTS

CROSS-REFERENCE TO RELATED APPLICATION

This application relates to United States patent application Ser. No. 13/528,302 entitled "DATA CACHE PREFETCH THROTTLE" filed Jun. 20, 2012, which is incorporated herein by reference.

BACKGROUND

This application relates generally to processor-based systems, and, more particularly, to providing hints during data cache prefetching in processor-based systems.

Many processing devices utilize caches to reduce the average time required to access information stored in a memory. A cache is a smaller and faster memory that stores copies of instructions or data that are expected to be used relatively frequently. For example, central processing units (CPUs) are generally associated with a cache or a hierarchy of cache memory elements. Other processors, such as graphics processing units or accelerated processing units, can also implement cache systems. Instructions or data that are expected to be used by the CPU are moved from (relatively large and slow) main memory into the cache. When the CPU needs to read or write a location in the main memory, it first checks to see whether a copy of the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the average latency of memory accesses to a value below the main memory latency and close to the cache access latency.

A prefetcher can be used to populate the lines in the cache before the information in these lines has been requested from the cache. The prefetcher can monitor memory requests associated with applications running in the CPU and use the monitored requests to determine or predict that the CPU is likely to access a particular sequence of memory addresses in the main memory. For example, the prefetcher may detect sequential memory accesses by the CPU by monitoring a miss address buffer that stores addresses of previous cache misses. The prefetcher then fetches the information from locations in the main memory in a sequence (and direction) determined by the sequential memory accesses in the miss address buffer and stores this information in the cache so that the information is available before it is requested by the CPU. Prefetchers can keep track of multiple streams and independently prefetch data for the different streams.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for data cache prefetch hinting. One exemplary embodiment of the method includes bypassing, at a first prefetcher associated with a first cache, issuing requests to prefetch data from a number of memory addresses in a sequence of memory addresses determined by the first prefetcher. The number is indicated in a request received from a second prefetcher associated with a second cache. This embodiment of the method also includes issuing, from the first prefetcher, a request to prefetch data from a memory address subsequent to the bypassed memory addresses.

In another embodiment, an apparatus is provided for data cache prefetch hinting. One exemplary embodiment of the apparatus includes a first prefetcher configurable to bypass issuing requests to prefetch data from a number of memory addresses in a sequence of memory addresses determined by the first prefetcher. The number is indicated in a request received from a second prefetcher associated with a second cache. The exemplary embodiment of the first prefetcher is configurable to issue a request to prefetch data from a memory address subsequent to the bypassed memory addresses.

In yet another embodiment, a processor-based system is provided for data cache prefetch hinting. One exemplary embodiment of the processor-based system includes a memory, a first cache associated with the memory, a first prefetcher for prefetching data into the first cache, a second cache associated with the first cache, and a second prefetcher for prefetching data into the second cache. The first prefetcher is configurable to bypass issuing requests to prefetch data from a number of memory addresses in a sequence of memory addresses determined by the first prefetcher. The number is indicated in a request received from the second prefetcher. The first prefetcher is configurable to issue a request to prefetch data from a memory address subsequent to the bypassed memory addresses.

In a further embodiment, computer readable media including instructions that when executed can configure a manufacturing process used to manufacture a semiconductor device that includes an integrated circuit including a first prefetcher configurable to bypass issuing requests to prefetch data from a number of memory addresses in a sequence of memory addresses determined by the first prefetcher. The number is indicated in a request received from a second prefetcher associated with a second cache. The first prefetcher is configurable to issue a request to prefetch data from a memory address subsequent to the bypassed memory addresses.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

Memory caches can prefetch cache lines that are expected to be requested from the cache by processor cores. For example, when two requests from a processor core miss consecutive addresses in a cache, a prefetcher may predict that the processor core is going to request additional addresses in the pattern indicated by the misses. The prefetcher may therefore prefetch cache lines from memory or another cache so that these lines are available in the cache if the processor core requests them. In a hierarchical cache system, a processor core may request cache lines from a lower level cache (such as an L1 data or instruction cache), the lower level cache may request cache lines from a higher level cache (such as an L2 cache), and the higher level cache may request lines from a main memory or an even higher level cache (such as an L3 cache).

Higher-level caches typically have higher latencies relative to lower level caches, i.e., it takes more time for the higher level cache to retrieve information from the next higher memory or cache level. Caches that have higher latencies typically issue more prefetch requests in response to a miss, e.g., they have a higher prefetch distance. For example, an L1 data cache may have as many as three prefetch requests outstanding and an L2 cache may have as many as 12 prefetch requests outstanding. Conventional L1 caches and L2 caches are unaware of each other's outstanding prefetch requests. Consequently, the higher level cache may request the same line twice (e.g., once in response to a demand request from the lower-level cache and once in response to a prefetch request from the higher-level prefetcher) resulting in duplicated effort that unnecessarily consumes power, time, and other system resources. Issuing duplicate requests also costs the prefetcher the opportunity to prefetch another cache line.

Embodiments of the prefetchers described herein may be configured to address the aforementioned difficulties in the conventional practice by storing information indicating the number of outstanding prefetch requests for a lower level cache prefetch stream. In one embodiment, the prefetch request information, which may be referred to as a prefetch hint, may be attached to a stream entry. The prefetch hint can be forwarded to the higher level cache in response to the lower level prefetcher issuing a demand request to the higher level cache. The prefetcher for the higher level cache can use the prefetch hint and the address of the demand request to skip over addresses corresponding to the prefetch requests that are outstanding at the lower level prefetcher and train the higher-level prefetch stream to issue requests for subsequent addresses. The prefetcher for the higher level cache may then issue prefetch requests in response to demand or prefetch requests that miss the lower level cache. For example, the lower-level cache may use the first miss to allocate the prefetch stream and the second miss to train the prefetch stream. The first (and subsequent) request from the lower-level prefetcher to the higher-level cache includes the prefetch hint information. Assuming that the higher-level cache does not have the requested information, the higher level cache uses the first miss to allocate a prefetch stream, the second miss to train the prefetch stream, and the first prefetch request (with hints) to select the address of its next prefetch request.

Figure 1:
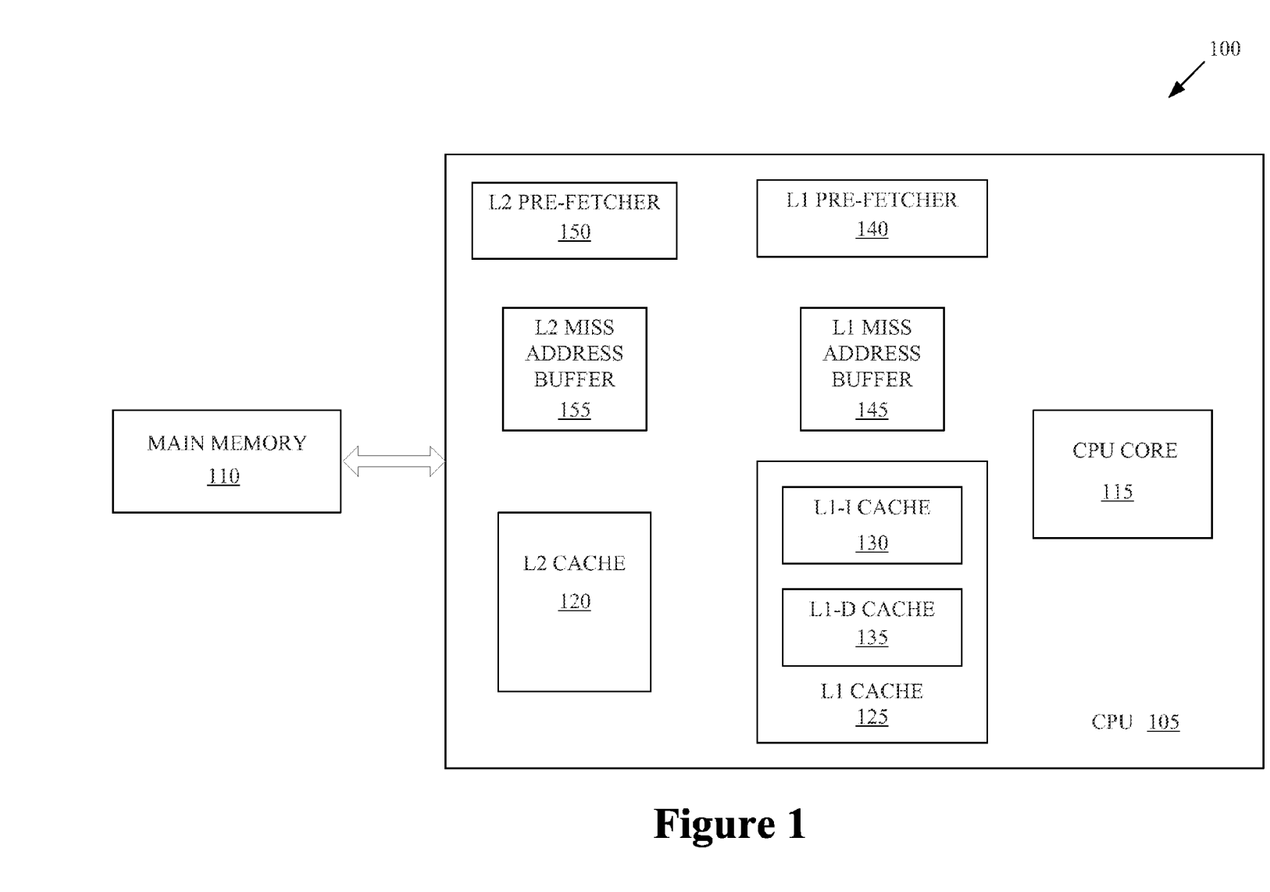
FIG. 1 conceptually illustrates a first exemplary embodiment of a semiconductor device that may be formed in or on a semiconductor wafer.

FIG. 1 conceptually illustrates a first exemplary embodiment of a semiconductor device 100 that may be formed in or on a semiconductor wafer (or die). The semiconductor device 100 may be formed in or on the semiconductor wafer using well known processes such as deposition, growth, photolithography, etching, planarising, polishing, annealing, and the like. In the illustrated embodiment, the device 100 includes a central processing unit (CPU) 105 that is configured to access instructions or data that are stored in the main memory 110. In the illustrated embodiment, the CPU 105 includes at least one CPU core 115 that is used to execute the instructions or manipulate the data. The CPU 105 also implements a hierarchical (or multilevel) cache system that is used to speed access to the instructions or data by storing selected instructions or data in the caches. However, persons of ordinary skill in the art having benefit of the present disclosure should appreciate that alternative embodiments of the device 100 may implement different configurations of the CPU 105, such as configurations that use external caches. Moreover, the techniques described in the present application may be applied to other processors such as graphical processing units (GPUs), accelerated processing units (APUs), and the like.

The illustrated cache system includes a level 2 (L2) cache 120 for storing copies of instructions or data that are stored in the main memory 110. In the illustrated embodiment, the L2 cache 120 is 16-way associative to the main memory 110 so that each line in the main memory 110 can potentially be copied to and from 16 particular lines (which are conventionally referred to as "ways") in the L2 cache 120. However, persons of ordinary skill in the art having benefit of the present disclosure should appreciate that alternative embodiments of the main memory 110 or the L2 cache 120 can be implemented using any associativity. Relative to the main memory 110, the L2 cache 120 may be implemented using smaller and faster memory elements. The L2 cache 120 may also be deployed logically or physically closer to the CPU core 115 (relative to the main memory 110) so that information may be exchanged between the CPU core 115 and the L2 cache 120 more rapidly or with less latency.

The illustrated cache system also includes an L1 cache 125 for storing copies of instructions or data that are stored in the main memory 110 or the L2 cache 120. Relative to the L2 cache 120, the L1 cache 125 may be implemented using smaller and faster memory elements so that information stored in the lines of the L1 cache 125 can be retrieved quickly by the CPU 105. The L1 cache 125 may also be deployed logically or physically closer to the CPU core 115 (relative to the main memory 110 and the L2 cache 120) so that information may be exchanged between the CPU core 115 and the L1 cache 125 more rapidly or with less latency (relative to communication with the main memory 110 and the L2 cache 120). Persons of ordinary skill in the art having benefit of the present disclosure should appreciate that the L1 cache 125 and the L2 cache 120 represent one exemplary embodiment of a multi-level hierarchical cache memory system. Alternative embodiments may use different multilevel caches including elements such as L0 caches, L1 caches, L2 caches, L3 caches, and the like. In some embodiments, higher-level caches may be inclusive of one or more lower-level caches so that lines in the lower-level caches are also stored in the inclusive higher-level cache(s). Caches are typically implemented in static random access memory (SRAM), but may also be implemented in other types of memory such as dynamic random access memory (DRAM).

In the illustrated embodiment, the L1 cache 125 is separated into level 1 (L1) caches for storing instructions and data, which are referred to as the L1-I cache 130 and the L1-D cache 135. Separating or partitioning the L1 cache 125 into an L1-I cache 130 for storing instructions and an L1-D cache 135 for storing data may allow these caches to be deployed closer to the entities that are likely to request instructions or data, respectively. Consequently, this arrangement may reduce contention, wire delays, and generally decrease latency associated with instructions and data. In one embodiment, a replacement policy dictates that the lines in the L1-I cache 130 are replaced with instructions from the L2 cache 120 and the lines in the L1-D cache 135 are replaced with data from the L2 cache 120. However, persons of ordinary skill in the art should appreciate that an alternative embodiment of the L1 cache 125 may not be partitioned into separate instruction-only and data-only caches 130, 135.

The CPU 105 also includes an L1 prefetcher 140 that can be used to populate lines in one or more of the L1 caches 125, 130, 135. In one embodiment, the L1 prefetcher 140 may be configured to prefetch lines into the data cache 135 and in that case it may be referred to as an L1 data cache prefetcher 140. The L1 prefetcher 140 is depicted in the illustrated embodiment as a separate logical element within the CPU 105. However, persons of ordinary skill in the art having benefit of the present disclosure should appreciate that the L1 prefetcher 140 may alternatively be implemented as a part of other logical elements. For example, the L1 prefetcher 140 may be implemented as a part of the logic of the L1-D cache 135. In one embodiment, the L1 prefetcher 140 can monitor memory requests associated with applications running in the CPU core 115. For example, the L1 prefetcher 140 can monitor memory requests that result in cache hits or misses, which may be recorded in a L1 miss address buffer 145. The L1 prefetcher 140 may determine or predict that the CPU core 115 is likely to access a particular sequence of memory addresses in the main memory 110. For example, the L1 prefetcher 140 may detect two or more sequential memory accesses by the CPU core 115. The direction of the sequence can be determined based on the temporal sequence of the sequential memory accesses and the CPU core 115 can use this direction to predict future memory accesses by extrapolating based upon the current or previous sequential memory accesses. The L1 prefetcher 140 can then fetch the information in the predicted locations from the L2 cache 120 or the main memory 110 and store this information in an appropriate cache so that the information is available before it is requested by the CPU core 115.

The CPU 105 may also include an L2 prefetcher 150 that can be used to populate lines in the L2 cache 120. The L2 prefetcher 150 is depicted in the illustrated embodiment as a separate logical element within the CPU 105. However, persons of ordinary skill in the art having benefit of the present disclosure should appreciate that the L2 prefetcher 150 may alternatively be implemented as a part of other logical elements. For example, the L2 prefetcher 150 may be implemented as a part of the logic of the L2 cache 120. In one embodiment, the L2 prefetcher 150 can monitor memory requests associated with applications running in the CPU core 115. For example, the L2 prefetcher 150 can monitor memory requests that result in cache hits or misses, which may be recorded in an L2 miss address buffer 155. The L2 prefetcher 150 may determine or predict that the CPU core 115 or the L1 prefetcher 140 is likely to access a particular sequence of memory addresses in the main memory 110. For example, the L2 prefetcher 150 may detect two or more sequential memory accesses by the CPU core 115, the caches 125, 130, 135, or the L1 prefetcher 140. The direction of the sequence can be determined based on the temporal sequence of the sequential memory accesses and the L2 prefetcher 150 can use this direction to predict future memory accesses by extrapolating based upon the current or previous sequential memory accesses. The L2 prefetcher 150 can then fetch the information in the predicted locations from the main memory 110 and store this information in an appropriate cache so that the information is available before it is requested by the CPU core 115, the caches 125, 130, 135, or the L1 prefetcher 140.

Figure 2:
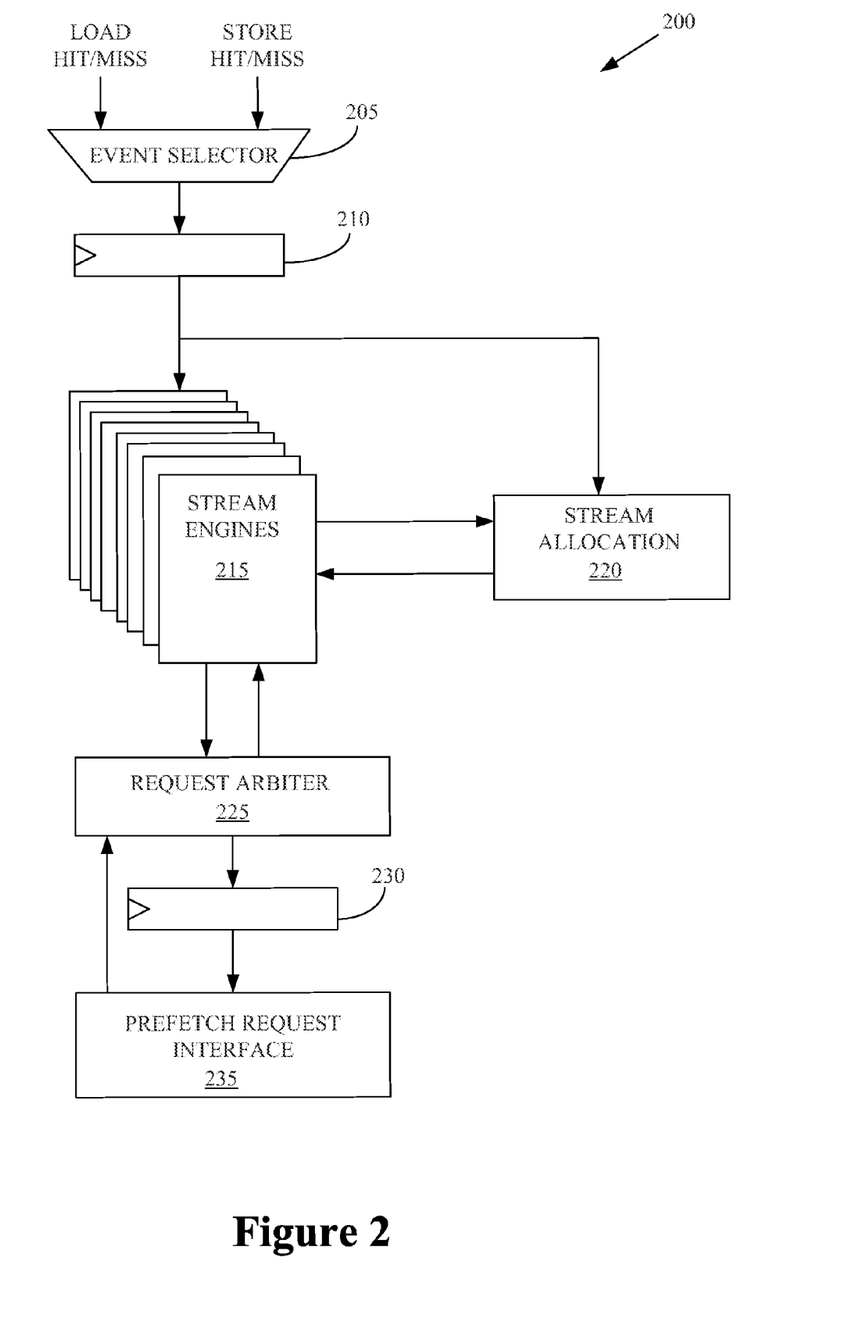
FIG. 2 conceptually illustrates one exemplary embodiment of a prefetcher such as the L1 prefetcher or the L2 prefetcher shown in FIG. 1.

FIG. 2 conceptually illustrates one exemplary embodiment of a prefetcher 200 such as the L1 prefetcher 140 or the L2 prefetcher 150 shown in FIG. 1. In the illustrated embodiment, the prefetcher 200 receives signals indicating particular events related to memory access requests such as hits or misses associated with a load instruction, hits or misses associated with a store instruction, and the like. Miss address buffer (MAB) events, such as hit or miss events for loads or stores, may be received or accessed by an event selector block 205, which is used to select events that are to be passed to other stages of the prefetcher 200. For example, the highest priority event may be stored in the registers 210 until they are passed to one or more stream engines 215 and a stream allocation unit 220, e.g., during a subsequent clock cycle. The priority of events can be determined using a hierarchy such as giving the highest priority to load misses and then assigning successively lower priorities to store misses, load hits, and store hits. However, persons of ordinary skill in the art having benefit of the present disclosure should appreciate that alternative hierarchies can be used to establish the priorities of the events.

In the illustrated embodiment, the prefetcher 200 includes one or more stream engines 215 that can be used to manage separate prefetch streams. The stream engines 215 may provide a signal to the stream allocation unit 220 to indicate that the current event either hit or missed the stream managed by the stream engine 215. If none of the existing streams indicates a hit for the MAB miss event, then the stream allocation unit 220 can allocate a new stream to a different stream engine 215 using the current event information. When a stream is first allocated, the stream engine 215 sets a page address and an offset value to the current event cache line address. The stream engine 215 can then monitor further MAB events to detect events at addresses adjacent to the current event cache line address in either direction. For example, if the current event cache line address is set to A, then the stream engine 215 looks for events at addresses in relation to the current event cache line address, e.g., addresses A+1 or A−1. If the stream engine 215 sees one of the addresses, it defines a stream in the appropriate direction (positive for A+1 and negative for A−1) and trains a new prefetch stream. In one embodiment, the stream engine 215 maintains a set of prefetch flags that indicate potential prefetches for the current stream address, as discussed herein. The prefetch flags may be set when the new prefetch stream is trained.

The prefetcher 200 may also include a request arbiter 225 that is used to arbitrate prefetch requests from the stream engines 215. In one embodiment, the request arbiter 225 is a rotating priority arbiter. However, persons of ordinary skill in the art having benefit of the present disclosure should appreciate that other types of request arbiter 225 may alternatively be implemented in the prefetcher 200. Requests can be transferred from the request arbiter 225 to a register 230 so that the request information can be provided to a prefetch request interface 235, e.g., during a subsequent clock cycle. The prefetch request interface 235 can provide feedback to the request arbiter 225, which can be used to select or arbitrate between pending requests from the stream engines 215.

In the illustrated embodiment, the stream engines 215 may also maintain stream entries that include information that identifies a state of the prefetch stream associated with the stream engine 215. In one embodiment, the stream entries may be stored in a database of entries. However, persons of ordinary skill in the art having benefit of the present disclosure should appreciate that the stream entries may be stored in any register, memory, or cache location. As discussed herein, each stream entry may include addressing information such as a page address or a line offset for the stream entry, one or more prefetch flags associated with addresses that may be prefetched, or other addressing information. The stream entry may also include "hint" information that indicates the number of pending prefetch requests associated with the stream entry.

Figure 3:
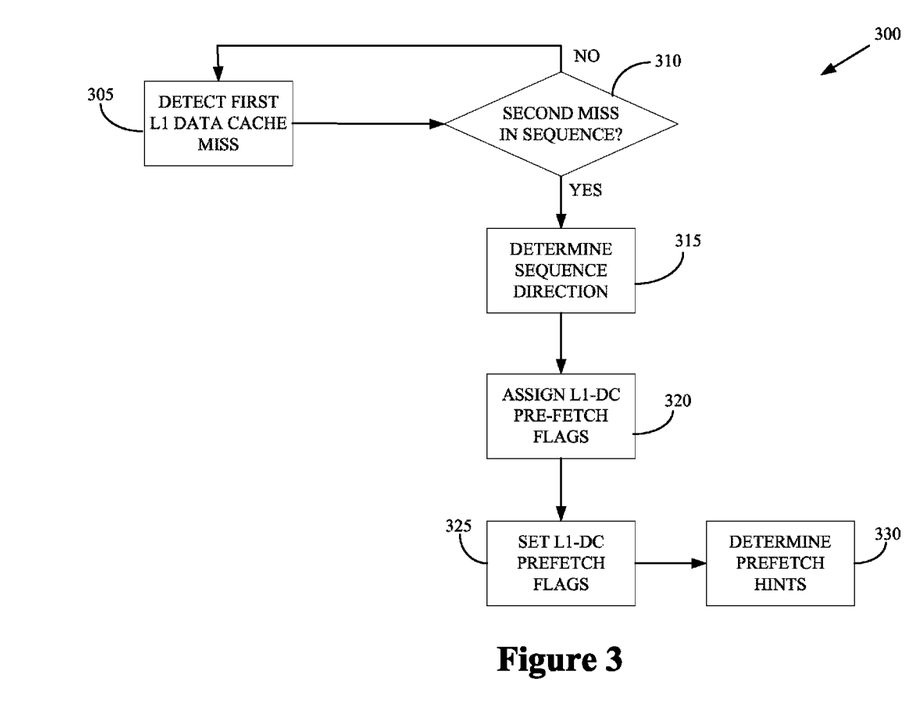
FIG. 3 conceptually illustrates one exemplary embodiment of a method for allocating a prefetch stream and identifying a look-ahead window using prefetch flags.

FIG. 3 conceptually illustrates one exemplary embodiment of a method 300 for allocating a prefetch stream and identifying a look-ahead window using prefetch flags. Embodiments of the method 300 may be implemented in the L1 data cache prefetcher 140 depicted in FIG. 1. However, persons of ordinary skill in the art having benefit of the present disclosure should appreciate that alternative embodiments of the method 300 may be implemented in any prefetcher that is capable of requesting lines from another cache that also implements prefetching. In the illustrated embodiment, a first cache miss is detected (at 305), e.g., using information about MAB events from a miss address buffer, and a stream is allocated to a prefetcher stream engine. The prefetcher stream engine waits until it detects (at 310) a second miss that is in sequence (in the positive or negative direction) with the first cache miss. Although detection of cache misses to sequential addresses is used to trigger creation of a prefetch stream in the illustrated embodiment, persons of ordinary skill in the art should appreciate that alternative embodiments may use different cache miss patterns to trigger creation of a prefetch stream. For example, the prefetch stream may be allocated in response to detecting cache misses to addresses separated by a predetermined stride value or some other pattern.

In the illustrated embodiment, the stream engine can use the addresses of the first and second cache misses to determine (at 315) the sequence direction. Prefetch flags may be assigned (at 320) to a selected number of addresses in the prefetch stream. The addresses that are assigned flags follow the sequence or pattern established by the first and second cache misses. For example, flags can be assigned (at 320) to a selected number of addresses (e.g., nine addresses) that follow the address of the second miss in the direction established for the prefetch stream. A selected number of the flags can then be set (at 325) to indicate that the prefetcher should fetch information from these addresses in subsequent clock cycles. For example, flags of a subset of the addresses (e.g., four of the nine flagged addresses) can be set so that these addresses may be fetched from the memory into the caches.

The prefetcher may then determine (at 330) a hint that may be used to indicate the number of pending prefetch requests. In one embodiment, the hint may be determined (at 330) by counting the number of set prefetch flags after the prefetcher has issued a request for information indicated by another set prefetch flag earlier in the sequence of flags. The hint information may be appended to a stream entry or stored so that the hint information can be provided to another prefetcher, as discussed herein.

Figure 4:
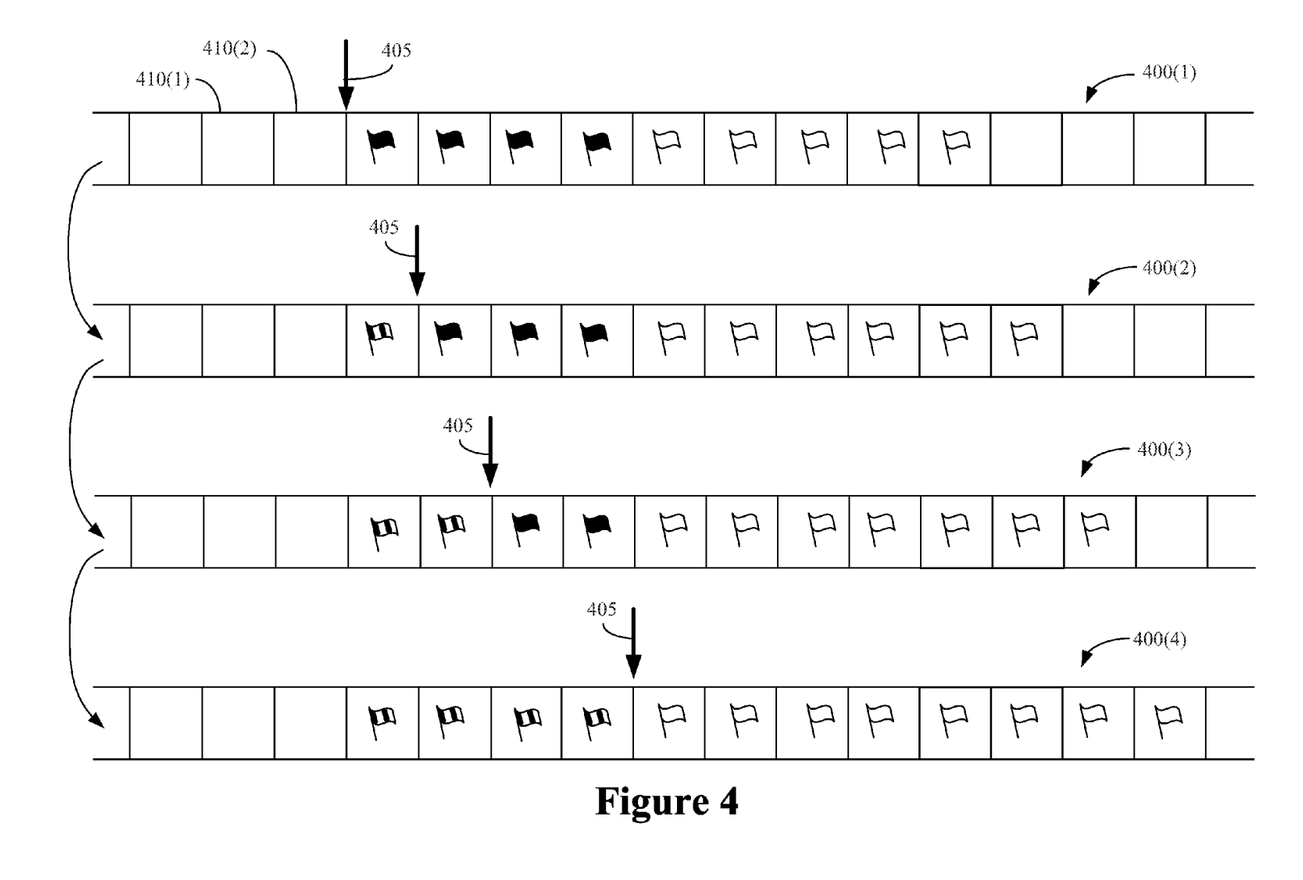
FIG. 4 conceptually illustrates a first exemplary embodiment of a prefetch stream that includes a sequence of addresses that can be flagged and prefetched.

FIG. 4 conceptually illustrates a first exemplary embodiment of a prefetch stream that includes an address sequence 400 of addresses that can be flagged and prefetched. The address sequences 400(1-4) illustrate the same set of addresses at successive time intervals or clock cycles. In the illustrated embodiment, the address sequences 400(1-4) are depicted at successive clock cycles. However, persons of ordinary skill in the art having benefit of the present disclosure should appreciate that the address sequences 400(1-4) may not be strictly sequential and in some cases may be separated by other events, time intervals, clock cycles, and the like. In the illustrated embodiment, a prefetch stream engine has assigned flags to nine addresses ahead of a base address indicated by the arrow 405. The stream engine has also set flags of four of the addresses ahead of the base address 405, as indicated by the filled-in flags, to indicate that the information in these addresses of the memory should be fetched into the cache. The four set prefetch flags indicate that there are four pending requests associated with this prefetch stream. Persons of ordinary skill in the art having benefit of the present disclosure should appreciate that the number of assigned flags or the number of flags in the subset of the assigned flags that are set are matters of design choice and may be varied to satisfy different design considerations.

The flags may be set in response to cache misses that are outside the look-ahead window of prefetch flags. In the illustrated embodiment, the prefetch stream is allocated and addresses of the prefetch window are flagged in response to successive cache misses 410(1-2). The flagged addresses begin at the base address 405 and the addresses are defined relative to the cache misses 410(1-2) or the base address 405. In the illustrated embodiment, the base address 405 is offset from the cache miss 410(2) by a selected address offset value of 1. For example, depending on the direction of the sequence, the flag addresses may be defined relative to the first cache miss address 410(1) as (A±2, A±3, A±4, A±5, . . . ) if the address of the first cache miss 410(1) is defined as A and the relative addresses in the prefetch window are defined as (±2, ±3, ±4, ±5, . . . ). Persons of ordinary skill in the art having benefit of the present disclosure should appreciate that the address offset value is a matter of design choice and may be varied to satisfy different design considerations.

The address sequence 400(1) has a set flag at the address ahead of the base address 405. The prefetcher may therefore fetch the data at this address into the cache. Once the data has been fetched, the base address 405 may be advanced to the next address and the address that was just fetched becomes part of the history of the stream and the flag at this address becomes a history flag that is indicated by the striped flag symbol and the address sequence 400(2). Following the fetch, three of the prefetch flags remain set and so there are three pending prefetch requests for this prefetch stream. An additional flag may be assigned to the address following the last address in the sequence in the direction of the established sequence so that the number of flags ahead of the base address 405 remains the same. In the illustrated embodiment, the prefetcher continues to fetch the addresses that have set flags and advance the base address 405 until all of the addresses that have set flags have been fetched. As the address corresponding to each set flag is fetched, the flag associated with this address is changed into a history flag as shown in the address sequences 400(3-4). An additional flag may be assigned to the next sequential address to maintain the number of flags ahead of the base address 405. History flags may also be dropped to maintain a set number of history flags trailing the base address 405.

Figure 5:
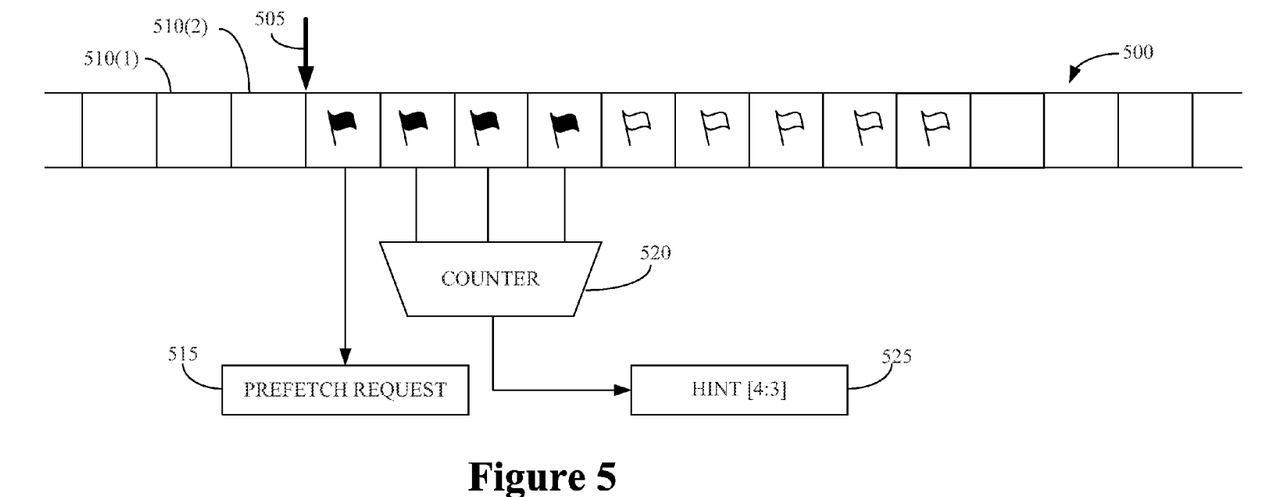
FIG. 5 conceptually illustrates one exemplary embodiment of an address sequence associated with a prefetch stream.

FIG. 5 conceptually illustrates one exemplary embodiment of an address sequence 500 associated with a prefetch stream. In the illustrated embodiment, a prefetch stream engine has assigned flags to nine addresses ahead of a base address indicated by the arrow 505. As discussed herein, the base address 505 and the direction of the address sequence may be determined based upon misses to addresses 510. The stream engine has also set flags of four of the addresses ahead of the base address 505, as indicated by the filled-in flags, to indicate that the information in these addresses of the memory should be fetched into the cache. The four set prefetch flags indicate that there are four pending requests associated with this prefetch stream.

In the illustrated embodiment, the prefetch stream engine issues a prefetch request 515 for the cache line indicated by the address associated with the first set flag. In response to issuing the prefetch request 515, a counter 520 may be used to count the number of pending prefetch requests associated with the prefetch stream. For example, following the prefetch request 515, the address sequence 500 includes set flags for three pending prefetch requests and so the counter 520 may count the three pending prefetch requests. The value determined by the counter may then be stored as a hint 525. In the illustrated embodiment, the hint 525 is represented by two bits [4:3], which is sufficient to store information indicating that there may be 0-3 pending prefetch requests. However, persons of ordinary skill in the art having benefit of the present disclosure should appreciate that alternative embodiments may include different numbers of bits in the hint 525 to represent different numbers of potential pending prefetch requests.

Figure 6:
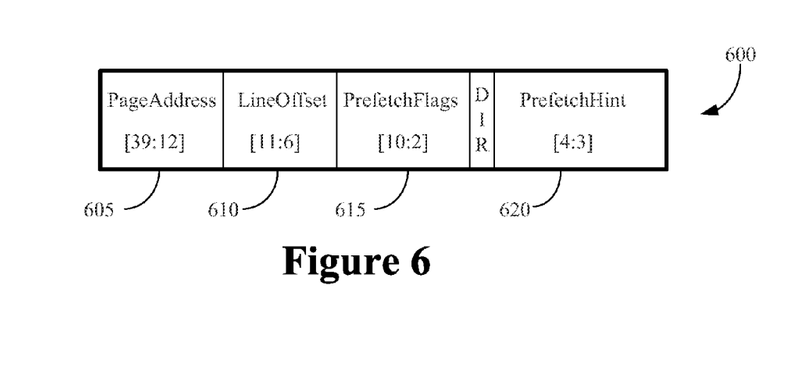
FIG. 6 conceptually illustrates one exemplary embodiment of a prefetch stream entry.

FIG. 6 conceptually illustrates one exemplary embodiment of a prefetch stream entry 600. In the illustrated embodiment, the prefetch stream entry 600 may be created, maintained, or stored by a corresponding stream engine in a prefetcher. The prefetch stream entry 600 includes information indicating a page address 605 corresponding to a page of data associated with the stream, a line offset 610 that indicates the current line offset within the page associated with the stream, and prefetch flags 615 that can be set to indicate a request to prefetch data from the associated line in the page. The stream entry 600 may also include a direction bit (DIR) that indicates whether the stream corresponds to ascending or descending addresses. The stream entry 600 also includes prefetch hint information 620 that includes information indicating the number of pending prefetch requests associated with the corresponding prefetch stream. In one embodiment, the prefetch stream engine associated with the prefetch stream can modify the values in the prefetch hints 620, e.g., in response to issuing a prefetch request. For example, if the prefetch hint 620 initially has a value of 3 and issuing the prefetch request reduces the number of pending prefetch requests to 2, the prefetch stream engine may modify the value of the prefetch hint 620 to have a value of 2.

Figure 7:
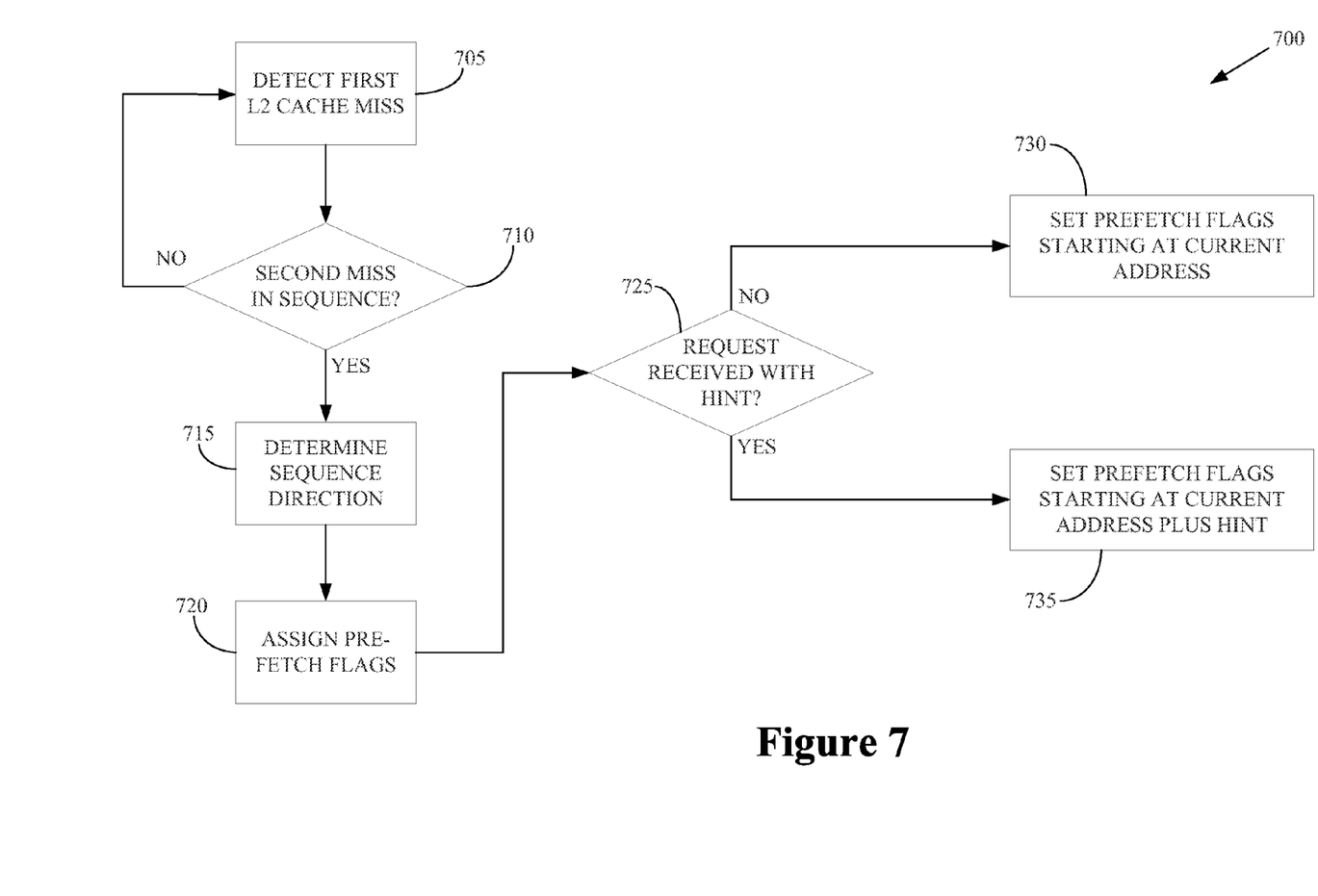
FIG. 7 conceptually illustrates one exemplary embodiment of a method for allocating a prefetch stream and identifying a look-ahead window using prefetch flags.

FIG. 7 conceptually illustrates one exemplary embodiment of a method 700 for allocating a prefetch stream and identifying a look-ahead window using prefetch flags. Embodiments of the method 700 may be implemented in the L2 data cache prefetcher 150 depicted in FIG. 1. However, persons of ordinary skill in the art having benefit of the present disclosure should appreciate that alternative embodiments of the method 700 may be implemented in any prefetcher that is capable of receiving demand requests or prefetch requests from another cache that also implements prefetching. In the illustrated embodiment, a first L2 cache miss is detected (at 705), e.g., using information about MAB events from a miss address buffer, and a stream is allocated to a prefetcher stream engine. The prefetcher stream engine then waits until it detects (at 710) a second miss that is in sequence (in the positive or negative direction) with the first cache miss. Although detection of cache misses to sequential addresses is used to trigger creation of a prefetch stream in the illustrated embodiment, persons of ordinary skill in the art should appreciate that alternative embodiments may use different cache miss patterns to trigger creation of a prefetch stream. For example, the prefetch stream may be allocated in response to detecting cache misses to addresses separated by a predetermined stride value or some other pattern.

In the illustrated embodiment, the stream engine can use the addresses of the first and second cache misses to determine (at 715) the sequence direction. Prefetch flags may be assigned (at 720) to a selected number of addresses in the prefetch stream. The addresses that are assigned flags follow the sequence or pattern established by the first and second cache misses. For example, flags can be assigned (at 720) to a selected number of addresses (e.g., 12 or more addresses) that follow the address of the second miss in the direction established for the prefetch stream. The stream engine for the prefetch stream may then determine (at 725) whether prefetch hint information has been received from an associated cache, e.g., with a demand request or prefetch request from the associated cache.

A subset of the assigned flags may then be set based upon the received demand request or prefetch request. In one embodiment, if no hint information has been received, then a selected number of the flags can be set (at 730) beginning at a predetermined offset to indicate that the prefetcher should fetch information from the flagged addresses in subsequent clock cycles. For example, flags of a subset of the addresses (e.g., 12 flagged addresses) can be set (at 730) so that these addresses may be fetched from the memory into the cache. However, if the stream engine determines (at 725) that hint information indicating a number of pending prefetch requests at the associated cache has been received, the prefetch flags may be set (at 735) at an offset that differs from the predetermined offset. In the illustrated embodiment, the prefetch flags may be set (at 735) for addresses beginning at an offset equal to the predetermined offset plus the number of pending prefetch requests indicated by the hint information.

Setting (at 735) the address in this manner allows the prefetcher to bypass or skip over issuing requests for lines that may already have been requested by the other associated cache. For example, an L2 cache can set (at 735) flags associated with addresses in advance of the addresses associated with lines that either have been requested or are pending in one or more prefetch streams associated with an L1 cache. Bypassing or skipping these addresses reduces the number of redundant prefetch requests performed at the L2 level and increases the number of opportunities available to prefetch information into the L2 cache.

Figure 8A:
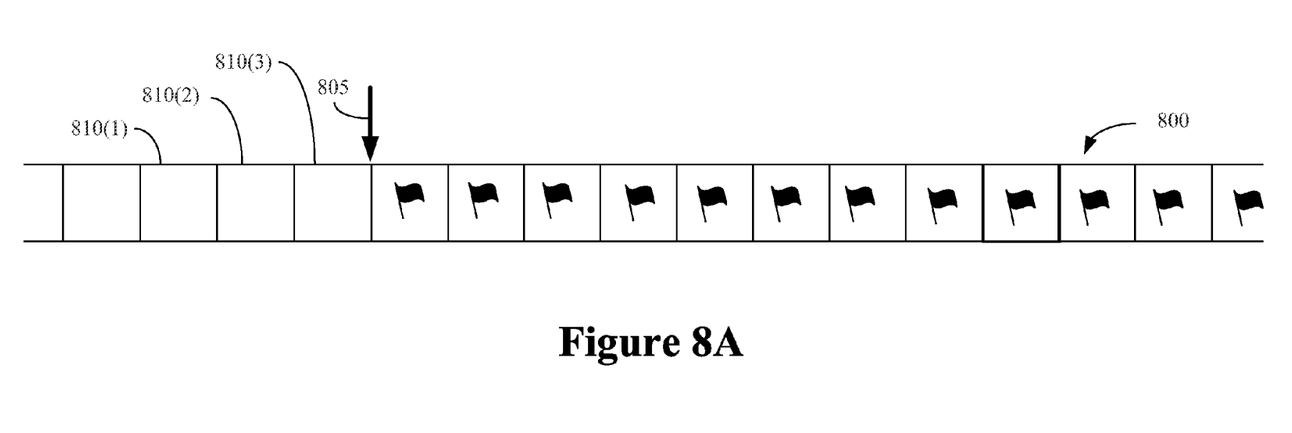
FIG. 8A conceptually illustrates one exemplary embodiment of an address sequence associated with a prefetch stream.

FIG. 8A conceptually illustrates one exemplary embodiment of an address sequence 800 associated with a prefetch stream. In the illustrated embodiment, a prefetch stream engine has assigned flags to 12 or more addresses ahead of a base address indicated by the arrow 805. As discussed herein, the base address 805 and the direction of the address sequence may be determined based upon misses to the addresses 810. The stream engine has also set flags of 12 addresses ahead of the base address 805, as indicated by the filled-in flags, to indicate that the information in these addresses of the memory should be fetched into the cache. In the illustrated embodiment, the flags have been set in response to receiving a prefetch request from an associated (e.g., lower-level) cache for a line indicated by an address 810(3). The stream engine did not receive any hints from the lower-level prefetcher and so the flags are set beginning at a predetermined offset of 1 from the address 810(3) indicated by the prefetch request. However, as discussed herein, the predetermined offset is a matter of design choice and may be varied to satisfy different design or operational considerations.

Figure 8B:
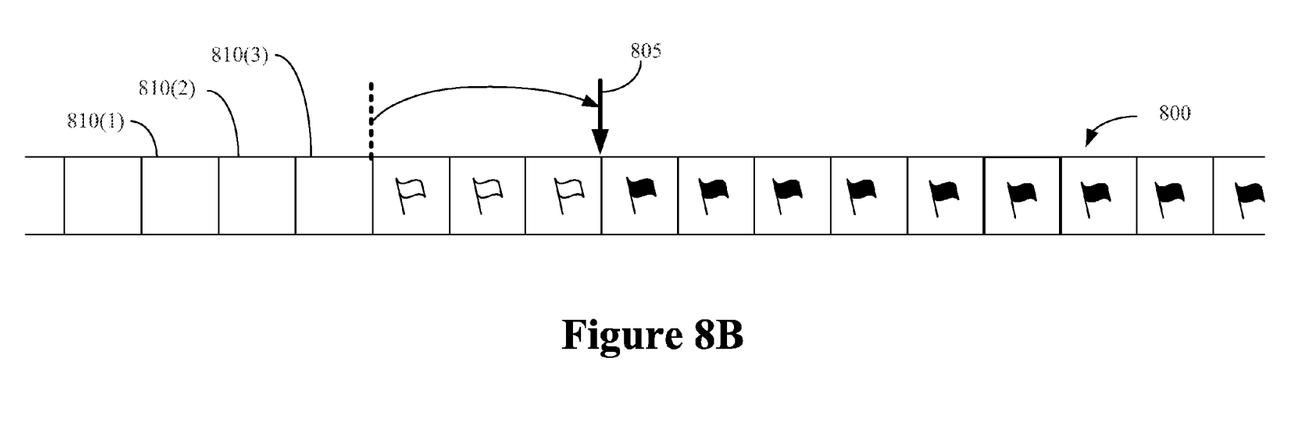
FIG. 8B conceptually illustrates another exemplary embodiment of the address sequence associated with the prefetch stream of FIG. 8A.

FIG. 8B conceptually illustrates another exemplary embodiment of the address sequence 800 associated with the prefetch stream. In the illustrated embodiment, a prefetch stream engine has assigned flags to 12 or more addresses ahead of a base address indicated by the arrow 805. As discussed herein, the base address 805 and the direction of the address sequence may be determined based upon misses to the addresses 810. The stream engine has also set flags of addresses ahead of the base address 805, as indicated by the filled-in flags, to indicate that the information at these addresses in the memory should be fetched into the cache. In the illustrated embodiment, the flags have been set in response to receiving a prefetch request from an associated (e.g., lower-level) cache for a line indicated by an address 810(3). The stream engine in the illustrated embodiment received a hint from the lower-level prefetcher indicating 3 pending prefetch requests at the associated lower-level prefetcher. Consequently, the stream engine sets flags beginning at a predetermined offset of 1 plus the number of pending prefetch requests (3) from the address 810(3) indicated by the prefetch request. The higher-level prefetcher may therefore bypass or skip over issuing prefetch requests for the bypassed or skipped addresses.

Embodiments of processor systems that can provide or utilize prefetch hints as described herein (such as the processor system 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
bypassing, at a first prefetcher associated with a first cache, issuing requests to prefetch data from a number of memory addresses in a sequence of memory addresses determined by the first prefetcher, wherein the number is indicated in a request received from a second prefetcher associated with a second cache and wherein the number is based on a number of outstanding prefetch requests at the second prefetcher; and
issuing, from the first prefetcher, a request to prefetch data from a memory address subsequent to the bypassed memory addresses.

2. The method of claim 1, comprising determining, at the first prefetcher, the sequence of memory addresses for prefetching data into lines of the first cache in response to detecting at least one cache miss to at least one first address, wherein the sequence of memory addresses is determined relative to said at least one first address.

3. The method of claim 1, comprising storing information indicating the number of outstanding prefetch requests at the second prefetcher.

4. The method of claim 3, wherein storing the information indicating the number of outstanding prefetch requests comprises counting a number of pending prefetch requests in response to the second prefetcher issuing a prefetch request and appending a number of pending prefetch requests to a stream entry associated with the prefetch request issued by the second prefetcher.

5. The method of claim 4, comprising transmitting the information indicating the number of outstanding prefetch requests to the first cache with prefetch requests transmitted from the second prefetcher to the first cache.

6. The method of claim 1, wherein the sequence of memory addresses is indicated by a corresponding plurality of flags, wherein bypassing issuing requests to prefetch data from the number of memory addresses comprises leaving a number of the flags unset that corresponds to the bypassed number of memory addresses and setting at least one subsequent flag to indicate a pending prefetch request for the corresponding memory address.

7. The method of claim 6, wherein issuing the request to prefetch data comprises issuing a request to prefetch data from the memory address corresponding to said at least one subsequent flag that has been set.

8. An apparatus, comprising:
a first prefetcher configurable to bypass issuing requests to prefetch data from a number of memory addresses in a sequence of memory addresses determined by the first prefetcher, wherein the number is indicated in a request received from a second prefetcher associated with a second cache, wherein the number is based on a number of outstanding prefetch requests at the second prefetcher, and wherein the first prefetcher is configurable to issue a request to prefetch data from a memory address subsequent to the bypassed memory addresses.

9. The apparatus of claim 8, comprising a first cache associated with the first prefetcher, and wherein the first prefetcher is configurable to determine the sequence of memory addresses for prefetching data into lines of the first cache in response to detecting at least one cache miss to at least one first address, wherein the sequence of memory addresses is determined relative to said at least one first address.

10. The apparatus of claim 8, comprising the second prefetcher, and wherein the second prefetcher is configurable to store information indicating the number of outstanding prefetch requests at the second prefetcher.

11. The apparatus of claim 10, wherein the second prefetcher is configurable to count a number of pending prefetch requests in response to issuing a prefetch request, and wherein the second prefetcher is configurable to append a number of pending prefetch requests to a stream entry associated with the prefetch request issued by the second prefetcher.

12. The apparatus of claim 11, wherein the second prefetcher is configurable to transmit the information indicating the number of outstanding prefetch requests to a first cache with prefetch requests transmitted from the second prefetcher to the first cache.

13. The apparatus of claim 8, wherein the sequence of memory addresses is indicated by a corresponding plurality of flags, wherein the first prefetcher is configurable to leave a number of the flags unset that corresponds to the bypassed number of memory addresses, and wherein the first prefetcher is configurable to set at least one subsequent flag to indicate a pending prefetch request for the corresponding memory address.

14. The apparatus of claim 13, wherein the first prefetcher is configurable to issue a request to prefetch data from the memory address corresponding to said at least one subsequent flag that has been set.

15. A processor-based system, comprising:
a memory;
a first cache associated with the memory;
a first prefetcher for prefetching data into the first cache;
a second cache associated with the first cache;
a second prefetcher for prefetching data into the second cache, wherein the first prefetcher is configurable to bypass issuing requests to prefetch data from a number of memory addresses in a sequence of memory addresses determined by the first prefetcher, wherein the number is indicated in a request received from the second prefetcher, and wherein the first prefetcher is configurable to issue a request to prefetch data from a memory address subsequent to the bypassed memory addresses; and wherein the second prefetcher is configurable to count a number of outstanding prefetch requests in response to issuing a prefetch request, and wherein the second prefetcher is configurable to append the number of outstanding prefetch requests to a steam entry associated with the prefetch request issued by the second prefetcher.

16. The processor-based system of claim 15, wherein the second prefetcher is configurable to transmit information indicating the number of outstanding prefetch requests to the first cache with prefetch requests transmitted from the second prefetcher to the first cache.

17. A non-transitory computer readable medium including instructions that when executed can configure a manufacturing process used to manufacture a semiconductor device comprising:

an integrated circuit comprising, a first prefetcher associated with a first cache and configurable to bypass issuing requests to prefetch data from a number of memory addresses in a sequence of memory addresses determined by the first prefetcher and wherein the first prefetcher is configurable to issue a request to prefetch data from a memory address subsequent to the bypassed memory addresses; and a counter for counting a number of outstanding prefetch requests at a second prefetcher associated with a second cache in response to the second prefetcher issuing a prefetch request; and the second prefetcher configurable to append a number of outstanding prefetch requests to a stream entry associated with the prefetch request issued by the second prefetcher.

18. The non-transitory computer readable medium of claim 17, further including instructions that when executed can configure a manufacturing process used to manufacture a semiconductor device comprising a second prefetcher configurable to transmit information indicating the number of outstanding prefetch requests to the first cache with prefetch requests transmitted from the second prefetcher to the first cache.

* * * * *